United States Patent
Liu et al.

(10) Patent No.: US 11,088,621 B2
(45) Date of Patent: *Aug. 10, 2021

(54) SECONDARY CONTROLLER FOR USE IN SYNCHRONOUS FLYBACK CONVERTER

(71) Applicant: Power Integrations, Inc., San Jose, CA (US)

(72) Inventors: Sheng Liu, San Jose, CA (US); Alex B. Djenguerian, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/158,965

(22) Filed: May 19, 2016

(65) Prior Publication Data

US 2016/0268909 A1 Sep. 15, 2016

Related U.S. Application Data

(63) Continuation of application No. 13/746,776, filed on Jan. 22, 2013, now Pat. No. 9,374,011.

(51) Int. Cl.
*H02M 1/08* (2006.01)
*H02M 3/335* (2006.01)
(Continued)

(52) U.S. Cl.
CPC ......... *H02M 3/33515* (2013.01); *H02M 1/08* (2013.01); *H02M 1/14* (2013.01);
(Continued)

(58) Field of Classification Search
CPC ...... H02M 1/08; H02M 1/14; H02M 3/33507; H02M 3/33515; H02M 3/33592;
(Continued)

(56) References Cited

U.S. PATENT DOCUMENTS 5,162,970 A 11/1992 Davis, Jr. et al.
5,650,357 A 7/1997 Dobkin et al.
(Continued)

FOREIGN PATENT DOCUMENTS

CN 101572485 A 11/2009
CN 102497105 A 6/2012
(Continued)

OTHER PUBLICATIONS

US 5,814,641 A, 09/1998, Faulk (withdrawn)
(Continued)

*Primary Examiner* — Thienvu V Tran
*Assistant Examiner* — Lorena D Bruner
(74) *Attorney, Agent, or Firm* — Christensen O'Connor Johnson Kindness PLLC

(57) ABSTRACT

A secondary controller for use in a power converter includes a drive circuit coupled to a secondary side of the power converter. The drive circuit is coupled to generate a first signal to enable a first switch coupled to a primary side of the primary converter. The first signal is generated in response to a feedback signal representative of an output of the power converter. A control circuit is coupled to receive the first signal and an input signal representative of a secondary winding voltage of the power converter. The control circuit is coupled to generate a second signal to control a second switch coupled to the secondary side of the power converter in response to the first signal and the input signal.

16 Claims, 5 Drawing Sheets

(51) Int. Cl.
*H02M 1/14* (2006.01)
*H02M 1/00* (2006.01)

(52) U.S. Cl.
CPC ... *H02M 3/33507* (2013.01); *H02M 3/33592* (2013.01); *H02M 2001/0009* (2013.01); *Y02B 70/10* (2013.01)

(58) Field of Classification Search
CPC ......... H02M 2001/0009; H02M 3/335; H02M 3/33576; Y02B 70/1475; Y02B 70/1476
USPC .............................. 363/21.13, 21.14, 21.06
See application file for complete search history.

(56) References Cited

U.S. PATENT DOCUMENTS

| | | | |
|---|---|---|---|
| 5,726,869 | A | 3/1998 | Yamashita et al. |
| 5,757,627 | A | 5/1998 | Faulk |
| 5,841,641 | A * | 11/1998 | Faulk .................... H02M 3/335 363/21.14 |
| 6,384,478 | B1 | 5/2002 | Pour |
| 6,496,395 | B2 | 12/2002 | Tokunaga et al. |
| 6,788,554 | B2 | 9/2004 | Havanur |
| 6,894,468 | B1 | 5/2005 | Bretz et al. |
| 6,998,952 | B2 | 2/2006 | Zhou et al. |
| 7,173,835 | B1 | 2/2007 | Yang |
| 7,193,866 | B1 | 3/2007 | Huang |
| 7,215,107 | B2 | 5/2007 | Djenguerian et al. |
| 7,345,896 | B2 | 3/2008 | Dalal |
| 7,385,832 | B2 | 6/2008 | Allinder |
| 7,468,547 | B2 | 12/2008 | Harvey |
| 7,515,442 | B2 | 4/2009 | Mikulenka et al. |
| 7,524,731 | B2 | 4/2009 | Wang |
| 7,619,297 | B2 | 11/2009 | Wang |
| 7,796,407 | B2 | 9/2010 | Yang |
| 7,868,431 | B2 | 1/2011 | Feng et al. |
| 7,884,696 | B2 | 2/2011 | Hébert et al. |
| 8,093,983 | B2 | 1/2012 | Fouquet et al. |
| 8,139,380 | B2 | 3/2012 | Sato |
| 8,374,004 | B2 | 2/2013 | Sutardja et al. |
| 8,772,909 | B1 | 7/2014 | Vinciarelli |
| 9,071,152 | B2 | 6/2015 | Morong et al. |
| 2004/0214376 | A1 | 10/2004 | Gibson et al. |
| 2005/0271148 | A1 | 12/2005 | Dupuis |
| 2006/0083037 | A1 | 4/2006 | Leung et al. |
| 2007/0041221 | A1 | 2/2007 | Phadke et al. |
| 2007/0153554 | A1 | 7/2007 | Matsumoto |
| 2008/0002441 | A1 * | 1/2008 | Allinder ............ H02M 3/33592 363/21.14 |
| 2008/0003441 | A1 | 1/2008 | Ohmi et al. |
| 2008/0042633 | A1 * | 2/2008 | Klein .................... H02M 3/157 323/288 |
| 2009/0086513 | A1 | 4/2009 | Lombardo et al. |
| 2009/0141521 | A1 * | 6/2009 | Yang ................. H02M 3/33592 363/49 |
| 2009/0279326 | A1 | 11/2009 | Hyuugaji |
| 2010/0039835 | A1 | 2/2010 | Shimada |
| 2010/0182806 | A1 * | 7/2010 | Garrity ............. H02M 3/33569 363/21.14 |
| 2010/0182808 | A1 | 7/2010 | Sato et al. |
| 2012/0075891 | A1 * | 3/2012 | Zhang .................... H02M 3/335 363/21.18 |
| 2012/0099345 | A1 * | 4/2012 | Zhao ....................... H02M 1/36 363/21.05 |
| 2014/0003096 | A1 * | 1/2014 | Deng ................. H02M 3/33592 363/21.14 |
| 2014/0055045 | A1 * | 2/2014 | Raval ................. H02M 3/33507 315/186 |
| 2014/0204625 | A1 | 7/2014 | Liu et al. |

FOREIGN PATENT DOCUMENTS

| | | |
|---|---|---|
| JP | H 09-260569 | 10/1997 |
| JP | H11-8974 A | 1/1999 |
| JP | H11341799 | 12/1999 |
| JP | 2001-275348 A | 10/2001 |
| JP | 2002-010634 A | 1/2002 |
| JP | 2002142455 | 5/2002 |
| JP | 2002-247844 A | 8/2002 |
| JP | 2003-244962 A | 8/2003 |
| JP | 2008-178170 A | 7/2008 |
| JP | 2009-071997 A | 4/2009 |
| JP | 2009-268325 A | 11/2009 |
| WO | 2007/138537 A2 | 12/2007 |

OTHER PUBLICATIONS

Lee, M., "CM6900 Application Note A-002A: Design a High Efficiency LED Power Supply Use CM6900+CM6807", Champion Microelectronic Corporation, Oct. 31, 2007, Taiwan, 10 pages.
"CM6901: SLS (SRC/LLC+SR) Controller with 1 FM+2 PWMs", Champion Microelectronic Corporation, Oct. 16, 2015, Taiwan, 16 pages.
EP Patent Application No. 14152028.8—Partial European Search Report, dated Feb. 15, 2017, 6 pages.
EP Patent Application No. 14152028.8—European Office Action, dated May 8, 2017, 7 pages.
EP Patent Application No. 14152028.8—European Search Report, dated Apr. 20, 2017, 6 pages.
CN Patent Application 201410030451.X—PRC (China) Office Action with Translation dated May 18, 2017, 20 pgs.
Japanese Patent Application No. 2014-008470—Office Action and Machine Translation dated Nov. 28, 2017, 8 pages.
EP Patent Application No. 14152028.8—European Office Action, dated Mar. 7, 2018, 5 pages.
"SC4910A/B High Performance Secondary Side Controller with Synchronous Rectifier," SEMTECH, last revised Jun. 1, 2005, 19 pages.
First Japanese Office Action dated May 7, 2019 for Japanese Application No. 2018-090463, 8 pages.
Japanese Decision of Refusal dated Nov. 19, 2019 for Japanese Application No. 2018-090463, 6 pages.
First Chinese Office Action dated Nov. 22, 2019 for Chinese Application No. 201810314939.3, 13 pages.
Indian First Examination Report dated Sep. 5, 2019 for Indian Application No. 29/DEL/2014, filed Jan. 6, 2014, 6 pages.
Extended European Search Report dated Oct. 28, 2019 for European Application No. 19169394.4, 9 pages.
Communication pursuant to Rules 70(2) and 70(2a) EPC and reference to Rule 39(1) EPC dated Dec. 2, 2019 for European Application No. 19169394.4, 2 pages.
First Examination Report dated Sep. 5, 2019 for Indian Application No. 29/DEL/2014, filed Jan. 6, 2014, 6 pages.
PRC (China) Patent Application No. 201810314939.3—Office Action with English Translation dated Jul. 9, 2020, 12 pages.
PRC (China) Patent Application No. 201810314939.3—Office Action with English Translation dated Jan. 11, 2021, 10 pages.
Japanese Patent Application No. 2020-047750—Notice of Reasons for Refusal with English Translation, dated Jan. 20, 2021.
European Patent Application No. 19169394.4—Office Action dated Mar. 24, 2021, 6 pages.

* cited by examiner

SECONDARY CONTROLLER FOR USE IN SYNCHRONOUS FLYBACK CONVERTER

CROSS-REFERENCE TO RELATED APPLICATIONS

This application is a continuation of U.S. patent application Ser. No. 13/746,776, filed on Jan. 22, 2013, now pending. U.S. patent application Ser. No. 13/746,776 is hereby incorporated by reference.

BACKGROUND INFORMATION

Field of the Disclosure

The present invention relates generally to controlling a power converter. More specifically, examples of the present invention are related to controlling switch mode power converters.

Background

Switch mode power converters are widely used for household or industrial appliances that require a regulated direct current (dc) source for their operation, such as for example battery chargers that are commonly used in electronic mobile devices. Off-line ac-dc converters convert a low frequency (e.g., 50 Hz or 60 Hz) high voltage ac (alternating current) input voltage to a required level of dc output voltage. Various types of switch mode power converters are popular because of their well regulated output, high efficiency, and small size along with their safety and protection features. Popular topologies of switch mode power converters include flyback, forward, boost, buck, half bridge and full bridge, among many others including resonant types.

Some switch mode power converters, such as a synchronous switch mode power converter, may include a first switch on the primary side of the power converter and also a second switch, such as a switch of a synchronous rectification circuit, on the secondary side of the power converter. The first switch may be switched between an ON state (i.e., closed switch) and an OFF state (i.e., open switch) to control the energy transfer between the input and the output of the power converter. The second switch may be used to increase the efficiency with which the energy is transferred to the output of the power converter when the first switch is switched to the OFF state. In operation, the second switch may be switched between the ON state and the OFF state in coordination with the first switch such that both switches are not in ON state simultaneously to prevent a condition where the power converter attempts to provide energy to a short circuit at the output that may lead to a reduction in the efficiency of the power converter.

A synchronous switch mode power converter may operate in both a continuous conduction mode and a discontinuous conduction mode depending on a load condition at the output of the power converter. It may be desirable for the power converter to run efficiently in both operation modes. Therefore, the secondary side of the power converter may coordinate the control of the second switch with the primary side of the power converter to ensure that the first switch and the second switch are not in ON state at the same time in both the continuous conduction mode and the discontinuous conduction mode.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
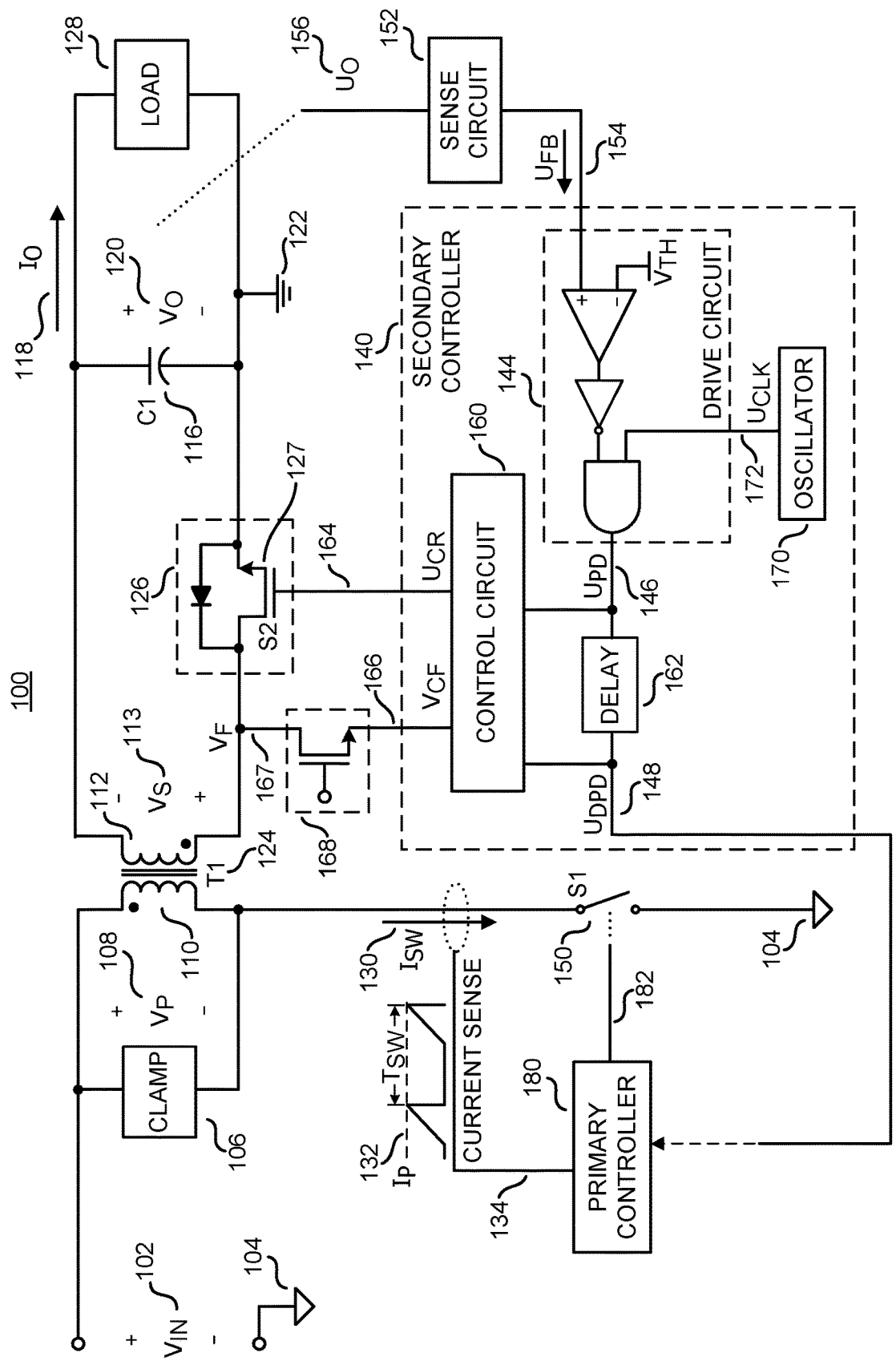
FIG. 1 shows a schematic of one example of a synchronous flyback switch mode power converter that includes a primary controller coupled to receive a signal from a secondary controller of the synchronous flyback switch mode power converter, in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

FIG. 1 shows a schematic of one example of a synchronous flyback switch mode power converter 100 that includes a primary controller 180 coupled to receive a signal from a secondary controller 140 of the synchronous flyback switch mode power converter 100, in accordance with the teachings of the present invention. In the example illustrated in FIG. 1, synchronous flyback switch mode power converter 100 utilizes secondary control. It is appreciated that secondary control for a flyback converter has advantages of tighter output regulation and faster response to load transients.

Synchronous flyback switch mode power converter 100 receives an unregulated input voltage $V_{IN}$ 102 at the input to produce an output voltage $V_O$ 120 and an output current $I_O$ 118 to an electrical load 128. Input voltage $V_{IN}$ 102 may be a rectified and filtered ac voltage. As shown, input voltage $V_{IN}$ 102 is referenced to a primary ground 104, also referred to as an input return and output voltage $V_{OUT}$ 120 is referenced to a secondary ground 122, also referred to as an output return. In other examples, synchronous flyback switch mode power converter 100 may have more than one output.

As further shown in FIG. 1, synchronous flyback switch mode power converter 100 includes a primary controller 180 and a secondary controller 140 to control the circuits of power converter 100 to regulate the output voltage $V_O$ 120 at a desired voltage level. In one example, synchronous flyback switch mode power converter 100 may regulate output voltage $V_O$ 120 to the desired voltage level after a startup period. The startup period may be a period of time starting from when synchronous flyback switch mode power converter 100 is introduced to input voltage $V_{IN}$ 102 until primary controller 180 and secondary controller 140 begin operating to regulate output voltage $V_O$ 120. In the example synchronous flyback switch mode power converter 100, an output capacitor C1 116 is coupled to the output to smooth out the ripple in output voltage $V_O$ 120.

Also included in FIG. 1 is an energy transfer element T1 124 that is illustrated as a coupled inductor with a primary winding 110 and a secondary winding 112. Energy transfer element T1 124 is coupled to transfer energy from primary winding 110 to secondary winding 112. Additionally, energy transfer element T1 124 provides galvanic isolation between circuits on the primary side of synchronous flyback switch mode power converter 100 and circuits on the secondary side of synchronous flyback switch mode power converter 100. In other words, a dc voltage applied between the primary side and the secondary side of synchronous flyback switch mode power converter 100 will produce substantially zero current.

Circuits that are electrically coupled to primary winding 110 may be referred to as the primary side of synchronous flyback switch mode power converter 100. Similarly, circuits that are electrically coupled to secondary winding 112 may be referred to as the secondary side of synchronous flyback switch mode power converter 100. In the depicted example, a switching device S1 150 is coupled to energy transfer element 124 at primary winding 110 and coupled to the input of synchronous flyback switch mode power converter 100 at input return 104. Switching device S1 150 may be a metal oxide field effect transistor (MOSFET), a bipolar junction transistor (BJT) or the like. As shown, primary controller 180 is coupled to the circuit components of the primary side such as switching device S1 150. Secondary controller 140 is coupled to the circuits on the secondary side such as a synchronous rectification circuit 126, secondary winding 112 along with other circuit components. In operation, primary controller 180 and secondary controller 140 control the circuits of synchronous flyback switch mode power converter 100 (e.g., switching device S1 150 and synchronous rectification circuit 126) to control energy transfer through energy transfer element T1 124 from the input to the output of synchronous flyback switch mode power converter 100.

A clamp circuit 106 is coupled across primary winding 110 of energy transfer element T1 124 and to the input of synchronous flyback switch mode power converter 100. Clamp circuit 106 operates to clamp any turn-off spikes that result from leakage inductance from primary winding 110 across the switching device S1 150.

Primary controller 180 and secondary controller 140 may be included in an integrated circuit. In one example, primary controller 180 is included in a first integrated circuit die and a secondary controller 140 is included in a second integrated circuit die that are both disposed in an integrated circuit package. In one example, switching device S1 150 may be included in a monolithic or hybrid structure in an integrated circuit package that also includes the primary controller 180 and the secondary controller 140. In one example, switching device S1 150 is disposed on a first integrated circuit die that also includes primary controller 180 and secondary controller 140 is included in a second integrated circuit die. In another example, switching device S1 150 is disposed on a first integrated circuit die, primary controller 180 is included in a second integrated circuit die, and secondary controller 140 is included in a third integrated circuit die. The die including the primary controller 180 is galvanically isolated from the die including the secondary controller 140. Accordingly, primary controller 180 is galvanically isolated from secondary controller 140.

Although primary controller 180 and secondary controller 140 are galvanically isolated from one another, primary controller 180 and secondary controller may communicate with one another. Specifically, secondary controller 140 may communicate with primary controller 180 by providing a signal through a magnetically coupled communication link (not shown in FIG. 1). In one example, the communication link between primary controller 180 and secondary controller 140 may be implemented using galvanically isolated conductive loops included in the lead frame of an integrated circuit package. Alternatively, secondary controller 140 may provide a signal to primary controller 180 through an opto-coupler or a coupled inductor.

In the illustrated example, secondary controller 140 transmits a delayed drive signal $U_{DPD}$ 148 to primary controller 180. Primary controller 180 controls the state of switching device S1 150 in response to delayed drive signal $U_{DPD}$ 148. For example, switching device S1 150 may operate in an ON state (e.g., as a closed switch) or in an OFF state (e.g., as an open switch) depending on switch drive signal 182 generated by primary controller 180 in response to delayed drive signal $U_{DPD}$ 148. In operation, primary controller 180 controls the primary current $I_{SW}$ 130 through switching device S1 150 and primary winding 110. In the illustrated example, primary controller 180 senses primary current $I_{SW}$ 130 as current sense signal 134. To sense primary current $I_{SW}$ 130, a variety of techniques may be used including receiving voltage across a resistor conducting current, receiving a scaled current from a current transformer, receiving the voltage across an on-resistance of a MOSFET that conducts current, or otherwise.

The waveform of current sense signal 134 in FIG. 1 shows that synchronous flyback switch mode power converter 100 is operating in discontinuous conduction mode, which may be typical for operation at light loads. A distinguishing characteristic of operation in discontinuous conduction mode is that primary current $I_{SW}$ 130 is substantially zero shortly after switching device S1 150 turns ON. At higher loads, synchronous flyback switch mode power converter 100 typically operates in continuous conduction mode, which is distinguished by having primary current $I_{SW}$ 130 having a non-zero value shortly after switching device S1 150 turns ON.

When switching device S1 150 is ON, the current through primary winding 110 increases the energy stored in energy transfer element T1 124. A primary winding voltage $V_P$ 108 with a first polarity develops across primary winding 110. A secondary winding voltage $V_S$ 113 with an opposite polarity of $V_P$ 108 develops across secondary winding 112 when switching device S1 150 is in ON state. Synchronous rectification circuit 126 may act as an open circuit when secondary winding voltage $V_S$ 113 is a positive voltage.

Primary controller 180 may transition switching device S1 150 from the ON state to the OFF state, thereby blocking the current through switching device S1 150 when primary current $I_{SW}$ 130 reaches a current limit $I_P$ 132, which in one example is a fixed limit. When switching device S1 150 transitions from the ON state to the OFF state, secondary winding voltage $V_S$ 113 becomes a negative voltage and allows for energy to be transferred to output capacitor C1 116, providing power to electrical load 128. In one example, secondary controller 140 may control synchronous rectification circuit 126 to act as a closed switch (i.e., to conduct current) when secondary winding voltage $V_S$ 113 transitions to a negative voltage so that output capacitor C1 116 is charged.

In the example, synchronous flyback switch mode power converter 100 also includes a secondary winding sense circuit 168. In one example, secondary winding sense circuit 168 is coupled to sense a forward voltage $V_F$ 167 representative of secondary winding voltage $V_S$ 113 and to generate a clamped version of forward voltage $V_F$ 167. In one example, forward voltage $V_F$ 167 is substantially equal to the sum of output voltage Vo 120 and secondary winding voltage $V_S$ 113. In the illustrated example, secondary winding sense circuit 168 generates a clamped forward voltage $V_{CF}$ 166, representative of the clamped version of forward voltage $V_F$ 167, by limiting the positive amplitude of clamped forward voltage $V_{CF}$ 166. More specifically, secondary winding sense circuit 168 includes a high voltage n-channel MOSFET, which is coupled to secondary winding 112, to sense forward voltage $V_F$ 167 and to produce clamped forward voltage $V_{CF}$ 166 by limiting the positive amplitude of clamped forward voltage $V_{CF}$ 166 to approximately 4.3V. It is noted that in other examples, secondary winding sense circuit 168 may not necessarily limit the positive amplitude of the signal generated at the output of secondary winding sense circuit 168. Secondary winding sense circuit 168 is enabled when synchronous flyback switch mode power converter 100 enters normal operation after secondary controller 140 is powered up during startup of synchronous flyback switch mode power converter 100. In one example, secondary winding sense circuit 168 may be disposed on the same integrated circuit die as secondary controller 140. In another example, secondary winding sense circuit 168 may be located outside the integrated circuit die that includes secondary controller 140 and may be coupled to provide clamped forward voltage $V_{CF}$ 166 to a winding sense terminal of secondary controller 140.

In the depicted example, secondary controller 140 includes a drive circuit 144 to generate a drive signal $U_{PD}$ 146 in response to a feedback signal $U_{FB}$ 154, which is representative of an output quantity $U_O$ 156 of synchronous flyback switch mode power converter 100. Output quantity $U_O$ 156 may include output voltage $V_O$ 120 and/or output current $I_O$ 118. In one example, a sense circuit 152 is coupled to sense output quantity $U_O$ 156 and to generate feedback signal $U_{FB}$ 154 in response to output quantity 156. In the illustrated example, secondary controller 140 is coupled to sense circuit 152 to receive feedback signal $U_{FB}$ 154 at a feedback terminal of secondary controller 140. In one example, sense circuit 152 includes a resistive divider coupled to the output of synchronous flyback switch mode power converter 100 to generate feedback signal $U_{FB}$ 154 as a scaled down voltage representative of output voltage $V_O$ 120. In one example, sense circuit 152 is disposed on the same integrated circuit die as secondary controller 140.

In the example secondary controller 140, drive signal $U_{PD}$ 146 may be representative of an enabled switching period or a disabled switching period for switching device S1 150. In other words, drive signal $U_{PD}$ 146 may indicate whether primary controller 180 should enable (allow to turn ON) or disable (not allow to turn ON) switching device S1 150 in a switching period which is defined by the time period between consecutive pulses of a clock signal $U_{CLK}$ 172 generated by an oscillator 170 that is included in secondary controller 140. For example, drive signal $U_{PD}$ 146 may indicate that primary controller 180 should enable switching device S1 150 to provide more energy to the secondary side of power converter 100 in a switching period when output voltage $V_O$ 120 drops below a desired voltage level. Similarly, drive signal $U_{PD}$ 146 may indicate that primary controller 180 should disable switching device S1 150 to provide less energy to the secondary side of power converter 100 in a switching period when output voltage $V_O$ 120 is substantially equal to or greater than the desired voltage level.

In the illustrated example, drive circuit 144 is coupled to receive clock signal $U_{CLK}$ 172 from oscillator 170. In one example, drive circuit 144 compares feedback signal $U_{FB}$ 154 to an output threshold $V_{TH}$ and generates drive signal $U_{PD}$ 146 as a logic high signal if feedback signal $U_{FB}$ 154 is less than the output threshold $V_{TH}$ when clock signal $U_{CLK}$ 172 is logic high. Drive circuit 144 generates drive signal $U_{PD}$ 146 as a logic low signal if feedback signal $U_{FB}$ 154 is greater than the output threshold $V_{TH}$ and/or clock signal $U_{CLK}$ 172 is logic low. In the illustrated example, drive circuit 144 includes an AND-gate coupled to output drive signal $U_{PD}$ 146 in response clock signal $U_{CLK}$ 172 and in response to the comparison of feedback signal $U_{FB}$ 154 to the output threshold $V_{TH}$. As further illustrated, the AND-gate is a two input AND-gate. Drive circuit 144 also includes an inverter coupled between a first input of the AND-gate and a comparator. In one example, the comparator is a voltage comparator with a threshold voltage substantially equal to the output threshold $V_{TH}$ and is further coupled to receive feedback signal $U_{FB}$ 154. A second input of the AND-gate is coupled to receive clock signal $U_{CLK}$ 172 from oscillator 170.

As further illustrated in FIG. 1, secondary controller 140 also includes a delay circuit 162 and a control circuit 160. Delay circuit 162 is coupled to drive circuit 144 to receive drive signal $U_{PD}$ 146 and coupled to delay drive signal $U_{PD}$ 146 to generate delayed drive signal $U_{DPD}$ 148. In the illustrated example, control circuit 160 is coupled to receive drive signal $U_{PD}$ 146, delayed drive signal $U_{DPD}$ 148, and clamped forward voltage $V_{CF}$ 166. Control circuit 160 is coupled to generate a control signal $U_{CR}$ 164 in response to drive signal $U_{PD}$ 146 and in response to clamped forward voltage $V_{CF}$ 166, as shown. Control circuit 160 may also be coupled to generate control signal $U_{CR}$ 164 in response to delayed drive signal $U_{DPD}$ 148.

Control signal $U_{CR}$ 164 controls synchronous rectification circuit 126. As shown in the example of FIG. 1, synchronous rectification circuit 126 is coupled to secondary winding 112 on the secondary side of synchronous flyback switch mode power converter 100. In the illustrated example, synchronous rectification circuit 126 includes a switch S2 127 controlled by control signal $U_{CR}$ 164 from secondary controller 140. In one example, switch S2 127 is a MOSFET whose gate is coupled to control signal $U_{CR}$ 164. Switch S2 127 may operate in the ON state (i.e., switch S2 127 is turned ON) or in the OFF state (i.e., switch S2 127 is turned OFF) depending on control signal $U_{CR}$ 164. When turned ON by the control signal $U_{CR}$ 164 from secondary controller 140, switch S2 127 of synchronous rectification circuit 126 may conduct current. In the illustrated example, synchronous rectification circuit 126 includes a diode, which may be a discrete component or may be included in the same component as the illustrated switch (e.g., body diode of the MOSFET).

Control circuit 160 may control switch S2 127 of synchronous rectification circuit 126 such that switching device S1 150 and switch S2 127 are not in ON state simultaneously which, if happens, may greatly reduce the efficiency of synchronous flyback switch mode power converter 100. Control circuit 160 may monitor clamped forward voltage $V_{CF}$ 166 and turn ON switch S2 127 when clamped forward voltage $V_{CF}$ 166 becomes a negative voltage indicating that switching device S1 150 has transitioned to OFF state. In one example, control circuit 160 may compare clamped forward voltage $V_{CF}$ 166 to a negative threshold voltage to determine if clamped forward voltage $V_{CF}$ 166 has become a negative voltage.

When switch S2 127 is in ON state, the energy stored in energy transfer element T1 124 is transferred to the output of synchronous flyback switch mode power converter 100 with a secondary current (not shown) charging output capacitor C1 116. The secondary current may decrease as output voltage $V_O$ 120 increases (i.e., as more energy is transferred to the output of synchronous flyback switch mode power converter 100). Since the current in switch S2 127 is substantially the same as the secondary current, the voltage drop across switch S2 127 may also decrease. This results in forward voltage $V_F$ 167 (and clamped forward voltage $V_{CF}$ 166) becoming less negative with respect to output return 122, which in one example is substantially zero volts. In one example, control circuit 160 may turn OFF switch S2 127 when clamped forward voltage $V_{CF}$ 166 becomes substantially zero volts.

When synchronous flyback switch mode power converter 100 operates in the discontinuous conduction mode, the secondary current drops to substantially zero before the start of the next enabled switching period (i.e., before drive signal $U_{PD}$ 146 becomes a logic high signal). Accordingly, forward voltage $V_F$ 167 (and clamped forward voltage $V_{CF}$ 166) increases to substantially zero volts from the negative voltage. Therefore, in the discontinuous conduction mode, control circuit 160 may use clamped forward voltage $V_{CF}$ 166 to determine when to turn OFF switch S2 127. Specifically, control circuit 160 may compare clamped forward voltage $V_{CF}$ 166 to the same negative threshold voltage and turn OFF switch S2 127 if clamped forward voltage $V_{CF}$ 166 is substantially equal to or greater than the negative threshold voltage.

When synchronous flyback switch mode power converter 100 operates in the continuous conduction mode, the secondary current does not drop to substantially zero before drive signal $U_{PD}$ 146 indicates that primary controller 180 should enable switching device S1 150 (i.e., before the start of the next enabled switching period). Accordingly, forward voltage $V_F$ 167 (and clamped forward voltage $V_{CF}$ 166) may stay lower than the negative threshold voltage until switching device S1 150 transitions to the ON state. As a result, control circuit 160 may not use clamped forward voltage $V_{CF}$ 166 to turn OFF switch S2 127 before switching device S1 150 transitions to ON state. In the illustrated example, in continuous conduction mode, control circuit 160 turns OFF switch S2 127 when drive signal $U_{PD}$ 146 becomes a logic high signal indicating that primary controller 180 should enable switching device S1 150. It should be noted that although drive signal $U_{PD}$ 146 indicates that primary controller 180 should enable switching device S1 150, primary controller 180 does not transition switching device S1 150 to the ON state before receiving the delayed version of drive signal $U_{PD}$ 146 (i.e., delayed drive signal $U_{DPD}$ 148) from secondary controller 140. It is in this manner that control circuit 160 ensures that switching device S1 150 and switch S2 127 are not in the ON state at the same time in both the discontinuous conduction mode and the continuous conduction mode of operation.

In the illustrated example, secondary controller 140 may be coupled to receive power from the secondary side of the synchronous flyback switch mode power converter 100. For example, secondary controller 140 may be coupled to a bypass capacitor (not shown) which may be coupled to secondary winding 112. When charged to a certain voltage level, the bypass capacitor may provide power to operate the circuits of secondary controller 140 such as control circuit 160. At startup, e.g., when input voltage $V_{IN}$ 102 is introduced to the input of synchronous flyback switch mode power converter 100, primary controller 180 starts switching the state of switching device S1 150 between the ON state and the OFF state and hence, the energy transfer to the secondary side of synchronous flyback switch mode power converter 100. However, the secondary side of synchronous flyback switch mode power converter 100 may not yet provide sufficient power to secondary controller 140 because for example, the bypass capacitor may be uncharged or may be charged to a voltage level lower than the required minimum to operate secondary controller 140. Therefore, secondary controller 140 may not send delayed drive signal $U_{DPD}$ 148 to primary controller 180 and may not produce control signal $U_{CR}$ 164 to control switch S2 127 of synchronous rectification circuit 126. Accordingly, at startup, switch S2 127 may remain in the OFF state and primary controller 180 may control the state of switching device S1 150 without receiving delayed drive signal $U_{DPD}$ 148 from secondary controller 140. It should be noted that although switch S2 127 may remain in the OFF state during the startup, the diode of synchronous rectification circuit 126 may conduct current when secondary winding voltage $V_S$ 113 becomes a negative voltage and hence, may allow for energy transfer from the primary side to the secondary side of synchronous flyback switch mode power converter 100. In this manner, the energy in the secondary side of synchronous flyback switch mode power converter 100 may increase during the startup and reach a level that is sufficient to operate secondary controller 140.

Figure 2:
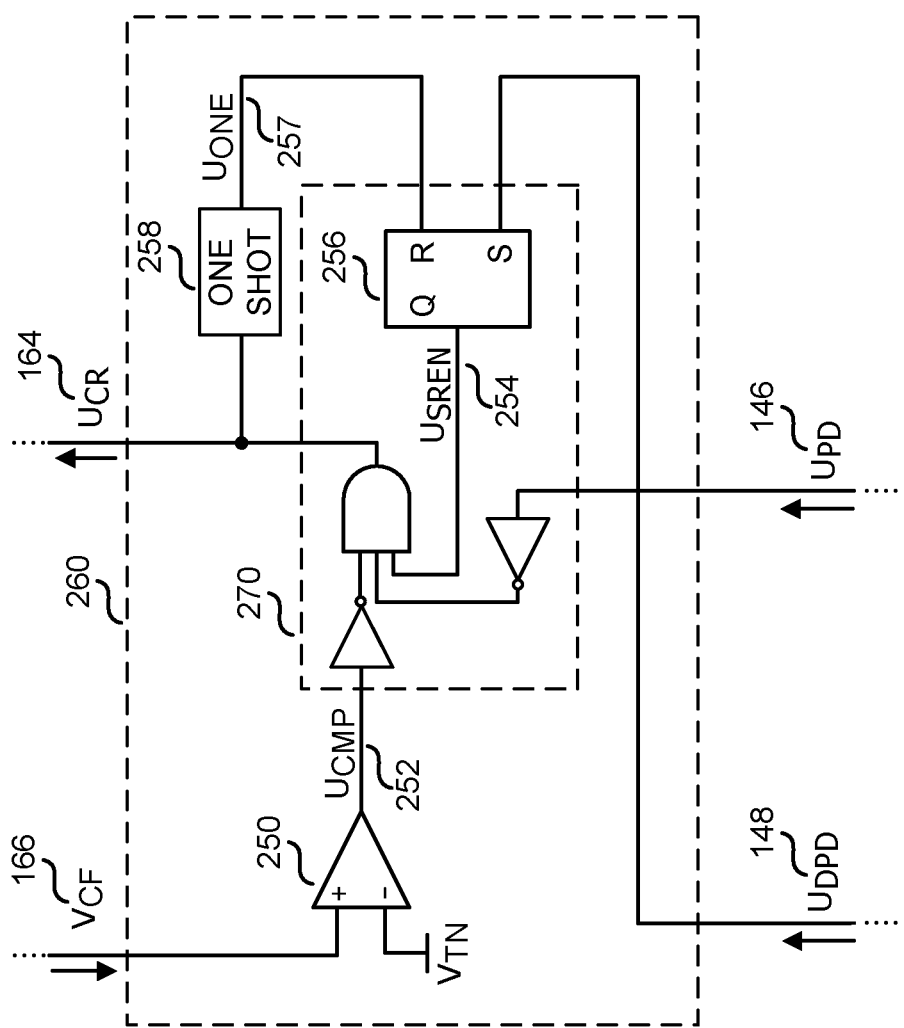
FIG. 2 shows a block diagram schematic of an example control circuit that may be included in a secondary controller of a synchronous flyback switch mode power converter, in accordance with the teachings of the present invention.

FIG. 2 shows a block diagram schematic of an example control circuit 260 that may be used as control circuit 160 in a secondary controller of an synchronous flyback switch mode power converter, in accordance with the teachings of the present invention. In the illustrated example, control circuit 260 includes a comparator 250, logic circuitry 270, and a one-shot circuit 258. Comparator 250 is coupled to generate a compare signal $U_{CMP}$ 252 in response to a comparison of a secondary threshold $V_{TN}$ to an input signal (e.g., clamped forward voltage $V_{CF}$ 166) representative of a secondary winding voltage (e.g., secondary winding voltage $V_S$ 113) of a synchronous flyback switch mode power converter. In one example, the secondary threshold $V_{TN}$ is −30 mV. Although FIG. 2 shows comparator 250 implemented as a voltage comparator, alternative examples may include a current comparator, or otherwise.

In FIG. 2, control circuit 260 also includes logic circuitry 270 coupled to comparator 250 and coupled to receive compare signal $U_{CMP}$ 252. Logic circuitry 270 is also coupled to receive drive signal $U_{PD}$ 146 from drive circuit 144. Logic circuitry 270 may be coupled to generate control signal $U_{CR}$ 164 to control switch S2 127 of synchronous rectification circuit 126 in response to compare signal $U_{CMP}$ 252 and drive signal $U_{PD}$ 146.

In the illustrated example, logic circuitry 270 includes a latch 256 and latch 256 is coupled to be set in response to drive signal $U_{PD}$ 146. Logic circuitry 270 may be coupled to receive delayed drive signal $U_{DPD}$ 148 from delay circuit 162 coupled to generate delayed drive signal $U_{DPD}$ 148 by delaying drive signal $U_{PD}$ 146. Latch 256 is coupled to be set by delayed drive signal $U_{DPD}$ 148, in the illustrated example. When latch 256 is set, the output of the latch generates enable signal $U_{SREN}$ 254 that goes to logic high. In the illustrated example, logic circuitry includes an AND-gate coupled to generate control signal $U_{CR}$ 164 (at the AND-gate output) in response to drive signal $U_{PD}$ 146, in response to compare signal $U_{CMP}$ 252, and in response to enable signal $U_{SREN}$ 254 from the latch output. In the illustrated example, the AND-gate is a three input AND-gate. Logic circuitry 270 also includes an inverter coupled between comparator 250 and a first input to the AND-gate, in the illustrated example. Additionally, an inverter is coupled to a second input of the AND-gate and coupled to invert drive signal $U_{PD}$ 146. A third input of the AND-gate receives enable signal enable signal $U_{SREN}$ 254, in the illustrated example.

Still referring to FIG. 2, a one-shot circuit 258 is coupled to receive control signal $U_{CR}$ 164 and reset latch 256 in response to control signal $U_{CR}$ 164. In one example, one-shot circuit 258 is coupled to reset latch 256 in response to a falling edge of control signal $U_{CR}$ 164. In one example, in response to control signal $U_{CR}$ 164, one-shot circuit 258 generates a pulse as one-shot signal $U_{ONE}$ 257 to reset latch 256. After latch 256 is reset, enable signal $U_{SREN}$ 254 on the latch output goes to logic low.

Figure 3A:
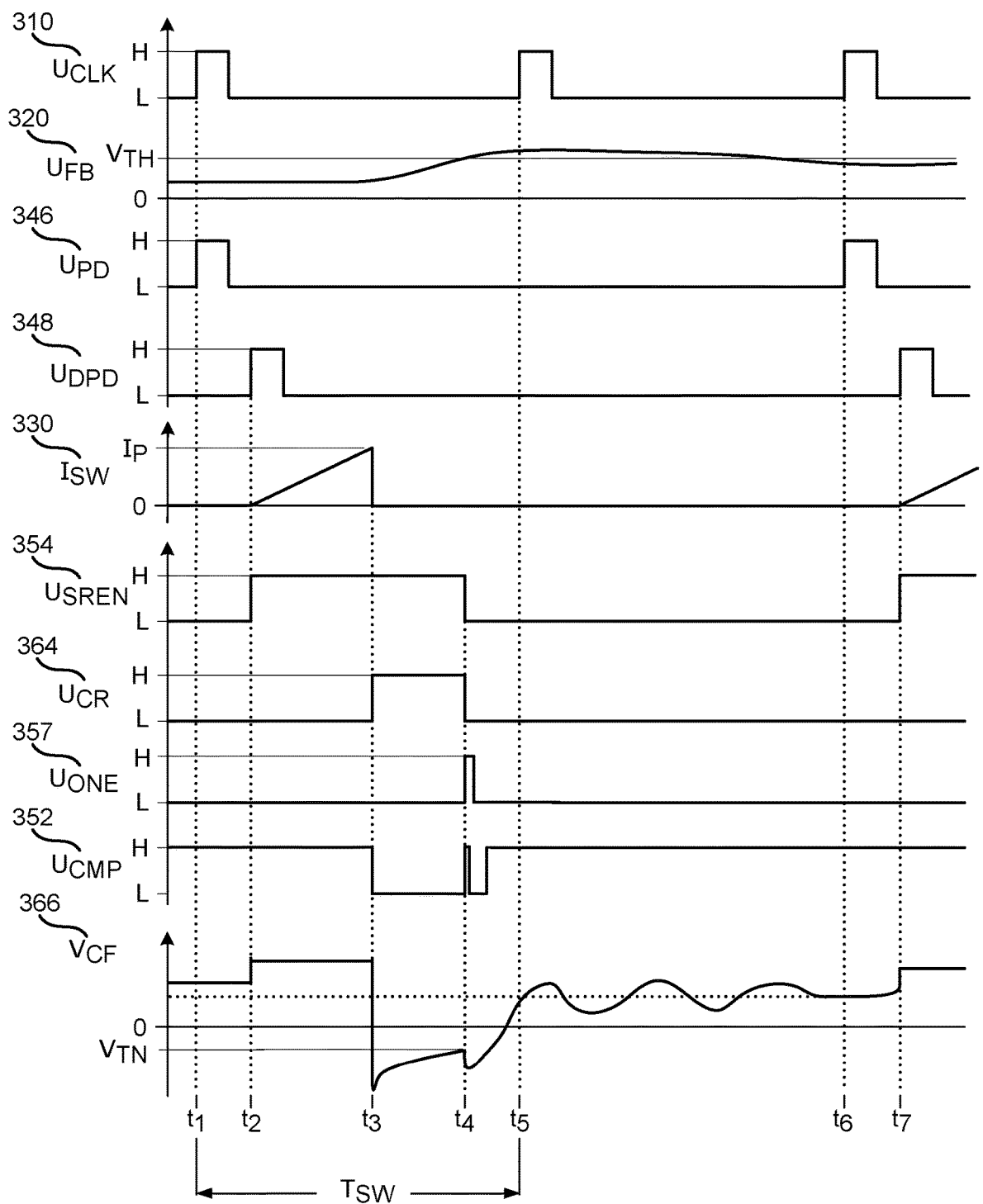
FIG. 3A illustrates an example timing diagram showing signals associated with a secondary controller operating in discontinuous conduction mode, in accordance with the teachings of the present invention.

FIG. 3A illustrates an example timing diagram showing signals associated with a secondary controller (e.g., secondary controller 140) operating in the discontinuous conduction mode, in accordance with the teachings of the present invention. Clock signal $U_{CLK}$ 310 is one possible representation of clock signal $U_{CLK}$ 172. Feedback signal $U_{FB}$ 320 is one possible representation of feedback signal $U_{FB}$ 154. Drive signal $U_{PD}$ 346 and delayed drive signal $U_{DPD}$ 348 are one possible representation of drive signal $U_{PD}$ 146 and delayed drive signal $U_{DPD}$ 148, respectively. Clock signal $U_{CLK}$ 310 is a periodic pulse whose period represents a switching period $T_{SW}$ (between time $t_1$ and time $t_5$). However, the actual switching period of synchronous flyback switch mode power converter 100 may be different from switching period $T_{SW}$ because drive signal $U_{PD}$ 346 determines whether synchronous flyback switch mode power converter 100 has an enabled switching period or a disabled switching period. An enabled switching period represents a switching period where switching device S1 150 is allowed to switch from the OFF state to the ON state (i.e., switching device S1 150 is enabled) in response to the switch drive signal 182. On the other hand, a disabled switching period represents a switching period where switching device S1 150 is not allowed (i.e., switching device S1 150 is disabled) to switch from the OFF state to the ON state and hence, remains in the OFF state. Specifically, if drive signal $U_{PD}$ 346 is logic high in a switching period $T_{SW}$, switching device S1 150 is then enabled in that switching period $T_{SW}$. However, if drive signal $U_{PD}$ 346 is logic low in a switching period $T_{SW}$, switching device S1 150 is disabled in that switching period $T_{SW}$. In an enabled switching period, primary controller 180 sets the switch drive signal 182 to logic high upon receiving a pulse in delayed drive signal $U_{DPD}$ 348 and as a result, switching device S1 150 may transition from the OFF state to the ON state. In a disabled switching period, primary controller 180 does not receive a pulse in delayed drive signal $U_{DPD}$ 348 and holds the switch drive signal 182 at logic low, thereby causing switching device S1 150 to remain in the OFF state.

The time period between time $t_1$ and time $t_5$ shows an enabled switching period, in FIG. 3A. The time period between time $t_5$ and time $t_6$ shows a disabled switching period. The time period after time $t_6$ shows the start of another enable switching period.

Between time $t_1$ and time $t_2$, clock signal $U_{CLK}$ 310 goes from logic low to logic high for a short period while feedback signal $U_{FB}$ 320 is below the output threshold $V_{TH}$. Since this is an indication that output voltage $V_O$ 120 is below a desired output voltage level, drive circuit 144 may switch drive signal $U_{PD}$ 346 to logic high for a duration that is substantially equal to the pulse width of the pulse of clock signal $U_{CLK}$ 310. Still referring to the time period between time $t_1$ and time $t_2$, comparator 250 outputs compare signal $U_{CMP}$ 352, one possible representation of compare signal $U_{CMP}$ 252, as logic high because clamped forward voltage $V_{CF}$ 366, which is one possible representation of clamped forward voltage $V_{CF}$ 166, is greater than the secondary threshold $V_{TN}$. Since the inverter in FIG. 2 inverts the logic high of compare signal $U_{CMP}$ 352 to a logic low, the AND-gate outputs control signal $U_{CR}$ 364, which is one possible representation of control signal $U_{CR}$ 164, as logic low and switch S2 127 of synchronous rectification circuit 126 is in OFF state. Enable signal $U_{SREN}$ 354, which is one possible representation of enable signal $U_{SREN}$ 254, is also logic low.

At time $t_2$, delayed drive signal $U_{DPD}$ 348 goes to logic high as delay circuit 162 generates drive signal $U_{DPD}$ 348 in response to drive signal $U_{PD}$ 346. In one example, delayed drive signal $U_{DPD}$ 348 lags behind the corresponding drive signal $U_{PD}$ 346 by 100 ns. Enable signal $U_{SREN}$ 354 goes to logic high as delayed drive signal $U_{DPD}$ 348 sets latch 256. Primary controller 180 (responding to the transition of delayed drive signal $U_{DPD}$ 348 to logic high) transitions switching device S1 150 to an ON state and primary current $I_{SW}$ 330, which is one possible representation of primary current $I_{SW}$ 130, increases from zero to current limit $I_P$ 132. At time $t_2$, clamped forward voltage $V_{CF}$ 366 climbs to represents a sum of output voltage $V_O$ 120 plus a scaled down voltage of input $V_{IN}$ 102. The scaled down voltage may be substantially equal to a voltage on input $V_{IN}$ 102 scaled by the ratio of a number of turns on primary winding 110 to a number of turns on secondary winding 112. Compare signal $U_{CMP}$ 352 is still greater than the secondary threshold $V_{TN}$ which means that control signal $U_{CR}$ 364 is logic low and switch S2 127 of synchronous rectification circuit 126 is in the OFF state.

At time $t_3$, primary current $I_{SW}$ 330 reaches current limit $I_P$ 132 and in response, primary controller 180 switches switching device S1 150 to the OFF state. Secondary winding voltage $V_S$ 113 becomes a negative voltage (which causes clamped forward voltage $V_{CF}$ 366 to become a negative voltage as well) and the diode of synchronous rectification circuit 126 starts conducting current as the diode becomes forward biased with the negative secondary winding voltage $V_S$ 113. As clamped forward voltage $V_{CF}$ 366 goes below the secondary threshold $V_{TN}$ of comparator 250, comparator 250 switches compare signal $U_{CMP}$ 352 from logic high to logic low. Since the AND-gate in logic circuitry 270 has three logic highs on its three inputs, the AND-gate outputs control signal $U_{CR}$ 364 as logic high and switch S2 127 of synchronous rectification circuit 126 transitions to the ON state.

After the sharp decline of clamped forward voltage $V_{CF}$ 366 at time $t_3$, clamped forward voltage $V_{CF}$ 366 increases as the energy in energy transfer element T1 124 is transferred from primary winding 110 to secondary winding 112. As output voltage $V_O$ 120 rises from the energy transfer to secondary winding 112, feedback signal $U_{FB}$ 320 becomes greater than the output threshold $V_{TH}$.

At time $t_4$, clamped forward voltage $V_{CF}$ 366 reaches the secondary threshold $V_{TN}$, which switches compare signal $U_{CMP}$ 352 to logic high. This causes the AND-gate to generate a logic low for control signal $U_{CR}$ 364, which switches switch S2 127 of synchronous rectification circuit 126 to the OFF state. In response to the falling edge of control signal $U_{CR}$ 364 (as it transitions from logic high to logic low), one-shot circuit 258 generates a short pulse that resets latch 256 and causes enable signal $U_{SREN}$ 354 of the latch output to go to logic low. The short pulse generated by one-shot circuit 258 is illustrated in FIG. 3A as one-shot signal $U_{ONE}$ 357, which is one possible representation of one-shot signal $U_{ONE}$ 257, in FIG. 2. When switch S2 127 of synchronous rectification circuit 126 is turned OFF, clamped forward voltage $V_{CF}$ 366 briefly drops below the secondary threshold $V_{TN}$ before continuing to climb. Of note, although clamped forward voltage $V_{CF}$ 366 briefly drops below the secondary threshold $V_{TN}$, enable signal $U_{SREN}$ 354 remains logic low because latch 256 was reset (and has not yet been set), which ensures that control signal $U_{CR}$ 364 does not inadvertently transition to logic high.

At time $t_5$, clock signal $U_{CLK}$ 310 goes to logic high while feedback signal $U_{FB}$ 320 is above the output threshold $V_{TH}$, so drive circuit 144 does not generate a logic high for drive signal $U_{PD}$ 346. Of course, without a logic high from drive signal $U_{PD}$ 346, delayed drive signal $U_{DPD}$ 348 also stays logic low and primary controller 180 does not transition switching device S1 150 to the ON state.

At some point (right before time $t_6$ in FIG. 3A), feedback signal $U_{FB}$ 320 drops below the output threshold $V_{TH}$, which causes drive circuit 144 to transition drive signal $U_{PD}$ 346 to logic high when clock signal $U_{CLK}$ 310 switches to logic high again (at time $t_6$ in FIG. 3A). With drive signal $U_{PD}$ 346 indicating the start of an enabled switching period, switching device S1 150 will be turned ON in response to switch drive signal 182 by primary controller 180 and energy will once again be delivered to the output of synchronous flyback switch mode power converter 100 to regulate output voltage $V_O$ 120. Notably, following the transition of drive signal $U_{PD}$ 346 from logic low to logic high at time $t_6$ with a time delay (e.g., 100 ns), delayed drive signal $U_{DPD}$ 348 goes to logic high at time $t_7$ and sets latch 256 so that control signal $U_{CR}$ 364 may once again go to logic high and turn ON switch S2 127 of synchronous rectification circuit 126.

Figure 3B:
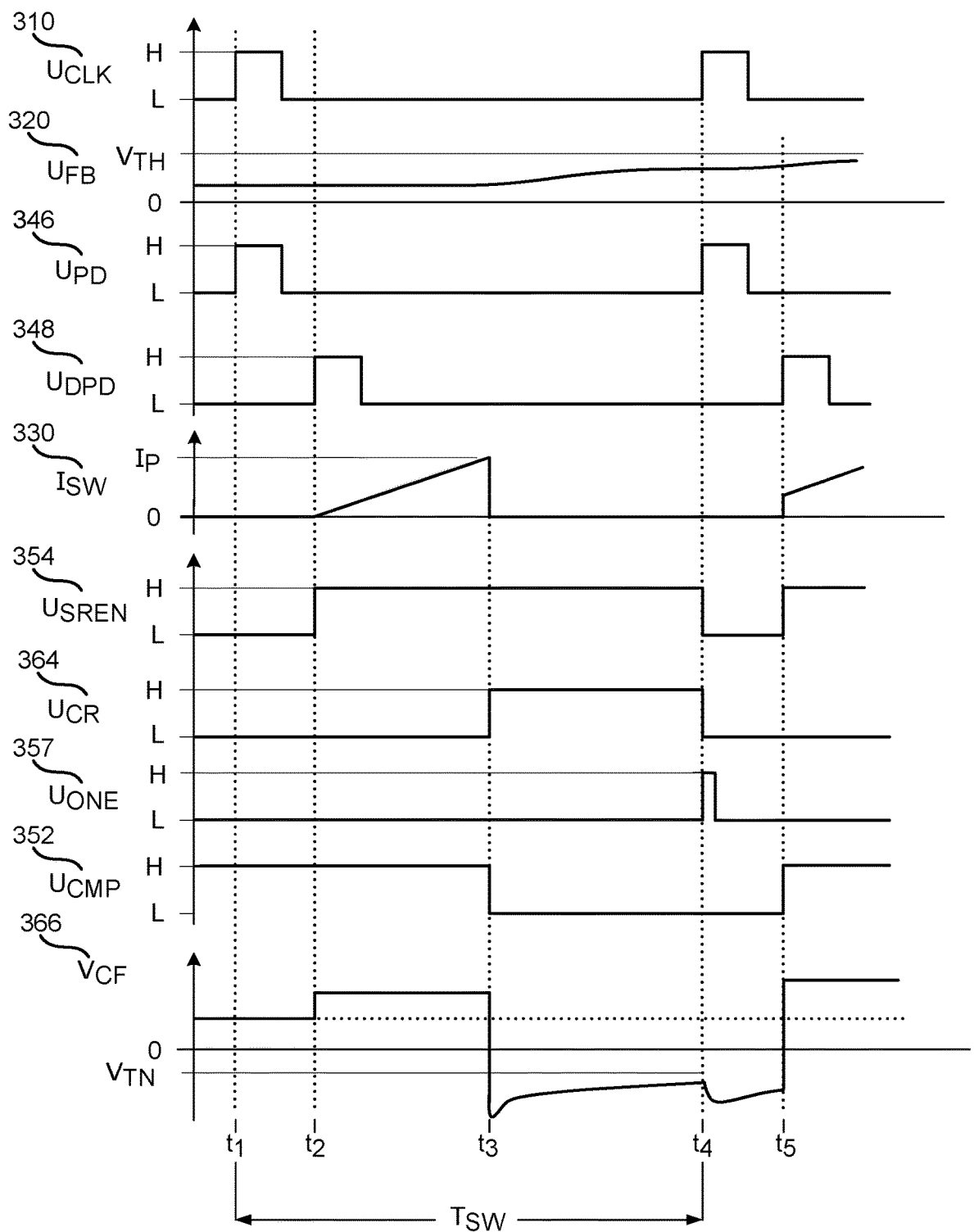
FIG. 3B illustrates an example timing diagram showing signals associated with a secondary controller operating in continuous conduction mode, in accordance with the teachings of the present invention.

FIG. 3B illustrates an example timing diagram showing signals associated with a secondary controller (e.g., secondary controller 140) operating in the continuous conduction mode, in accordance with the teachings of the present invention. The time period between time $t_1$ and time $t_4$ shows an enabled switching period, in FIG. 3B. From time period time $t_1$ to time $t_3$, FIG. 3A and FIG. 3B are similar.

In FIG. 3B, at time $t_3$, clamped forward voltage $V_{CF}$ 366 drops below the secondary threshold $V_{TN}$ after switching device S1 150 transitions to the OFF state. Clamped forward voltage $V_{CF}$ 366 then starts to increase as the energy in energy transfer element T1 124 is transferred to the output of synchronous switch mode power converter 100. At time $t_4$, clock signal $U_{CLK}$ 310 goes to logic high while clamped forward voltage $V_{CF}$ 366 has not yet reached the secondary threshold $V_{TN}$. Since clamped forward voltage $V_{CF}$ 366 is not above the secondary threshold $V_{TN}$, compare signal $U_{CMP}$ 352 stays logic low.

At time $t_4$, drive signal $U_{PD}$ 346 transitions to logic high, which indicates an enabled switching period. In response to the high drive signal $U_{PD}$ 346, the second input of the AND-gate goes to logic low causing control signal $U_{CR}$ 364 to go to logic low as well, which turns OFF switch S2 127 of synchronous rectification circuit 126. The falling edge of control signal $U_{CR}$ 364 (which turned off switch S2 127) causes one-shot circuit 258 to generate a pulse on one-shot signal $U_{ONE}$ 357 that resets latch 256.

At time $t_5$, compare signal $U_{CMP}$ 352 transitions to logic high and drive signal $U_{PD}$ 346 is logic low. Also at time $t_5$, delayed drive signal $U_{DPD}$ 348 transitions to logic high, which sets latch 256. Of course, delayed drive signal $U_{DPD}$ 348 also causes primary controller 180 to turn ON switching device S1 150 and as a result, primary current $I_{SW}$ 330 begins to rise from a non-zero value, as synchronous flyback switch mode power converter 100 is operating in the continuous conduction mode.

As discussed previously, efficiency of power converters is of high importance in industry. For efficiency purposes, switching device S1 150 and switch S2 127 of synchronous rectification circuit 126 should generally not be turned ON at the same time. In the illustrated example, secondary controller 140 is configured to control the switching of switch S2 127 in coordination with primary controller 180 in both the discontinuous conduction mode (FIG. 3A) and the continuous conduction mode (FIG. 3B), ensuring that switching device S1 150 and switch S2 127 of synchronous rectification circuit 126 are not turned ON at the same time.

Figure 4:
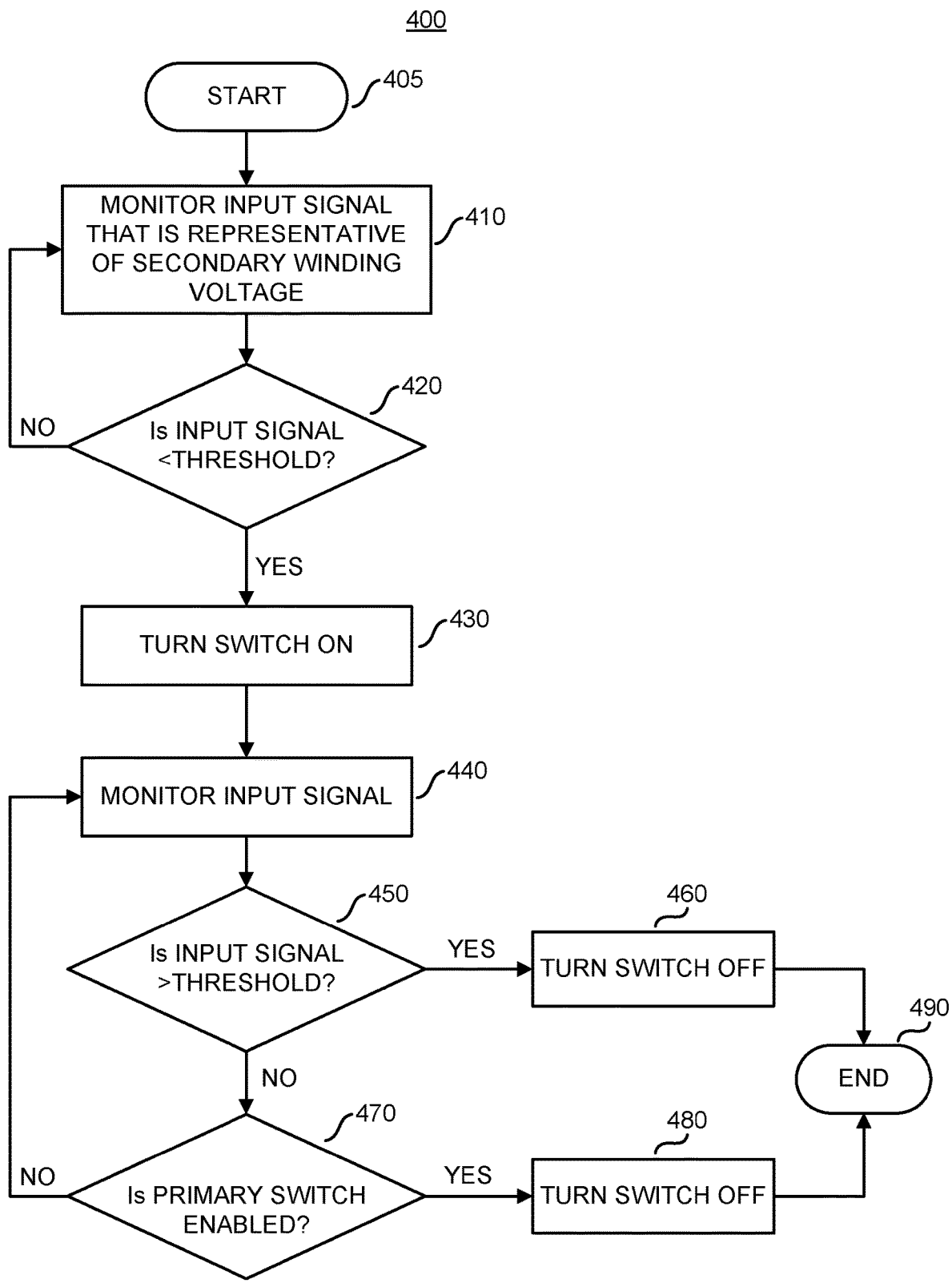
FIG. 4 is a flow chart illustrating an example process of operation of a synchronous flyback switch mode power converter, in accordance with the teachings of the present invention.

FIG. 4 is a flow chart illustrating an example process 400 of operation of a synchronous flyback switch mode power converter, in accordance with the teachings of the present invention. Process 400 starts at process block 405 with a primary switch (e.g., switching device S1 150) enabled (i.e., allowed to be turned ON). In process block 410, an input signal representative of a secondary winding voltage of a secondary winding of an energy transfer element of a synchronous flyback switch mode power converter is monitored. In decision block 420, the input signal representative of a secondary winding voltage of a secondary winding is compared to a threshold (e.g., the negative threshold $V_{TN}$). If the input signal representative of a secondary winding voltage of a secondary winding is greater than the threshold indicating that the primary switch is in the OFF state, process 400 returns to process block 410. If the input signal representative of a secondary winding voltage of a secondary winding is less than the threshold indicating that the primary switch has been switched to the OFF state, a secondary switch (e.g., switch S2 127 of synchronous rectification circuit 126) coupled to the secondary winding is enabled (e.g., switched to the ON state) in process 430.

In process block 440, the input signal representative of a secondary winding voltage of a secondary winding is monitored. In decision block 450, the input signal is compared with the threshold. If the input signal is greater than the threshold, process 400 proceeds to process block 460 where the secondary switch is disabled (e.g., switched to the OFF state). This will be the process followed while the synchronous flyback switch mode power converter is in the discontinuous mode. If the input signal representative of a secondary winding voltage is not greater than the threshold in decision block 450, process 400 will proceed to decision block 470 and determine whether a primary switch is enabled. If the primary switch is enabled in decision block 470, process 400 continues to process block 480 where the secondary switch is disabled. This will be the process followed while the synchronous flyback switch mode power converter is in the continuous conduction mode. Thus, the secondary switch is disabled in response to at least one of a plurality of events. The plurality of events that may trigger disabling the secondary switch includes the input signal reaching the threshold and includes a drive signal (e.g., drive signal $U_{PD}$ 346) having a level (e.g., logic high) to enable the primary switch. In one example, the plurality of events that will cause the secondary switch to be disabled may include the input signal reaching the threshold and the drive signal having a level to enable the primary switch.

If in decision block 470 the primary switch is not enabled, process 400 returns to process block 440. In the illustrated example, after the secondary switch is turned OFF in process block 460 or 480, process 400 ends at process block 490. However, in one example, process 400 returns to process block 405 instead of ending at process block 490.

In one example, the drive signal is generated in response to a clock signal and in response to a feedback signal representative of an output quantity (e.g., output quantity $U_O$ 156) of the synchronous flyback switch mode power converter. In one example, the output quantity includes the output voltage of the synchronous flyback switch mode power converter. The primary switch may be coupled to a primary winding of the energy transfer element and control a transfer of energy through the energy transfer element from an input of the synchronous flyback switch mode power converter to an output of the synchronous flyback switch mode power converter.

In one example, enabling the secondary switch (process block 430) includes setting a latch in response to the drive signal and disabling the secondary switch (process block 460 or 480) includes resetting the latch. Setting the latch may include delaying the drive signal such that the latch is set in response to the delayed drive signal. Resetting the latch may include detecting a falling edge of a control signal that enables and disables the secondary switch and the latch may be reset in response to detecting the falling edge of the control signal.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A secondary controller for use in a power converter, the secondary controller comprising:
    a drive circuit galvanically isolated from a primary side of the power converter, wherein the drive circuit is coupled to a secondary side of the power converter, wherein the secondary side of the power converter is galvanically isolated from a primary side of the power converter, wherein the drive circuit is coupled to generate a first signal on the secondary side of the power converter to enable a first switch coupled to the primary side of the power converter, wherein the secondary controller is configured to provide partial control of the first switch and does not generate a turn off signal to disable the first switch, and wherein the first signal is generated in response to a feedback signal representative of an output of the power converter; and
    a control circuit coupled to receive the first signal and an input signal representative of a secondary winding voltage of the power converter, wherein the control circuit is coupled to generate a second signal to control a second switch coupled to the secondary side of the power converter in response to the first signal and the input signal,
    wherein the control circuit further comprises a comparator coupled to receive the input signal and is coupled to generate a compare signal in response to the input signal and a threshold, wherein the control circuit is coupled to generate the second signal in response to the first signal and the compare signal,
    wherein the control circuit includes a latch coupled to be set in response to the first signal and coupled to be reset in response to the second signal, and wherein the control circuit is coupled to generate the second signal in response to an output of the latch.

2. The secondary controller of claim 1, wherein the control circuit is coupled to turn on the second switch when the input signal is less than a threshold and turn off the second switch in response to at least one of a plurality of events, wherein the plurality of events includes the input signal reaching the threshold after the input signal has fallen below the threshold and includes the first signal having a level to enable the first switch.

3. The secondary controller of claim 1, further comprising a delay circuit coupled to receive the first signal and coupled to generate a delayed first signal, wherein the latch is coupled to the delay circuit to be set in response to the delayed first signal.

4. The secondary controller of claim 1, wherein the control circuit includes a logic gate coupled to generate the second signal in response to the first signal, the compare signal, and the latch output.

5. The secondary controller of claim 4, wherein the logic gate is an AND gate.

6. The secondary controller of claim 1, further comprising a one-shot circuit coupled to the latch and coupled to receive the second signal, wherein the one-shot circuit is coupled to reset the latch in response to the second signal.

7. The secondary controller of claim 6, wherein the one-shot circuit is coupled to reset the latch in response to a falling edge of the second signal.

8. The secondary controller of claim 1, wherein the input signal is generated by a winding sense circuit that is coupled to a secondary winding of an energy transfer element of the power converter.

9. The secondary controller of claim 1, further comprising an oscillator coupled to generate a clock signal coupled to be received by the drive circuit, wherein the drive circuit is coupled to generate the first signal in response to the clock signal.

10. The secondary controller of claim 1, wherein the second switch is a synchronous rectifier.

11. The secondary controller of claim 1, wherein the first switch coupled to the primary side of the power converter is configured to be disabled by a primary controller coupled to the primary side of the power converter and enabled by the secondary controller.

12. A method of controlling a power converter, the method comprising:

generating a first signal on a secondary side of the power converter to enable a first switch coupled to a primary winding of an energy transfer element to enable a transfer of energy through the energy transfer element from an input of the power converter to an output of the power converter, wherein the secondary side of the power converter is galvanically isolated from a primary side of the power converter, wherein the first signal is generated in a secondary controller galvanically isolated from the first switch, and wherein the secondary controller is configured to provide partial control of the first switch and does not generate a turn off signal to disable the first switch;

comparing a threshold to an input signal representative of a voltage of a secondary winding of the energy transfer element;

generating, in the secondary controller galvanically isolated from the first switch, a second signal to enable a second switch coupled to the secondary winding in response to said comparing the threshold to the input signal; and generating the second signal to disable the second switch in response to at least one of a plurality of events, wherein the plurality of events includes the input signal reaching the threshold and includes the first signal having a level to enable the first switch, wherein generating the second signal to enable the second switch comprises setting a latch in response to the first signal, and wherein generating the second signal to disable the second switch comprises resetting the latch.

13. The method of claim 12, wherein setting the latch comprises delaying the first signal such that the latch is set in response to the delayed first signal.

14. The method of claim 12, wherein resetting the latch comprises detecting a falling edge of a second signal that enables and disables the second switch, wherein the latch is reset in response to said detecting the falling edge of the second signal.

15. The method of claim 12, further comprising generating the first signal in response to a clock signal and in response to an output of the power converter.

16. The method of claim 12, wherein the first switch coupled to the primary winding of the energy transfer element is configured to be disabled by a primary controller coupled to the primary side of the power converter.

\* \* \* \* \*